United States Patent
Xiao

(10) Patent No.: US 11,087,897 B2
(45) Date of Patent: Aug. 10, 2021

(54) DECONTAMINATION OF TRITIATED WATER

(71) Applicant: SAVANNAH RIVER NUCLEAR SOLUTIONS, LLC, Aiken, SC (US)

(72) Inventor: Xin Xiao, Augusta, GA (US)

(73) Assignee: Savannah River Nuclear Solutions, LLC, Aiken, SC (US)

( * ) Notice: Subject to any disclaimer, the term of this patent is extended or adjusted under 35 U.S.C. 154(b) by 40 days.

(21) Appl. No.: 16/512,883

(22) Filed: Jul. 16, 2019

(65) Prior Publication Data

US 2020/0027616 A1 Jan. 23, 2020

Related U.S. Application Data

(62) Division of application No. 15/034,611, filed as application No. PCT/US2013/069826 on Nov. 13, 2013, now Pat. No. 10,381,121.

(51) Int. Cl.
*B01D 49/00* (2006.01)
*G21F 9/12* (2006.01)
(Continued)

(52) U.S. Cl.
CPC .............. *G21F 9/12* (2013.01); *B01D 15/26* (2013.01); *B01D 53/0423* (2013.01);
(Continued)

(58) Field of Classification Search
CPC ........ B01D 15/26; B01D 59/26; B01D 59/28; B01D 2253/1122; B01D 2257/108;
(Continued)

(56) References Cited

U.S. PATENT DOCUMENTS

| 3,698,156 A | 10/1972 | Dirian |
| 3,888,974 A * | 6/1975 | Stevens ..................... C01B 5/02 |
| | | 423/580.2 |

(Continued)

FOREIGN PATENT DOCUMENTS

| CA | 1137025 | 12/1982 |
| DE | 3122498 | 6/1982 |

(Continued)

OTHER PUBLICATIONS

Butler, et al. "Novel Catalysts for Isotopic Exchange Between Hydrogen and Liquid Water" *Am. Chem. Soc.* (1978) pp. 93-109.

(Continued)

*Primary Examiner* — T. Bennett McKenzie
(74) *Attorney, Agent, or Firm* — Dority & Manning, PA.

(57) ABSTRACT

Methods and systems directed to the separation of tritium from an aqueous stream are described. The separation method is a multi-stage method that includes a first stage during which tritium of a tritium-contaminated aqueous stream is adsorbed onto a separation phase, a second stage during which the adsorbed tritium is exchanged with hydrogen in a gaseous stream to provide a gaseous stream with a high tritium concentration, and a third stage during which the tritium of the gaseous stream is separated from the gaseous stream as a gaseous tritium product.

21 Claims, 3 Drawing Sheets

(51) Int. Cl.
*C01B 4/00* (2006.01)
*G21F 9/30* (2006.01)
*B01D 15/26* (2006.01)
*B01D 53/04* (2006.01)
*B01D 59/26* (2006.01)
*B01D 59/28* (2006.01)
*C02F 1/28* (2006.01)
*C02F 101/00* (2006.01)

(52) U.S. Cl.
CPC ......... *B01D 53/0462* (2013.01); *B01D 59/26* (2013.01); *B01D 59/28* (2013.01); *C01B 4/00* (2013.01); *C02F 1/281* (2013.01); *C02F 1/285* (2013.01); *G21F 9/301* (2013.01); *B01D 2253/1122* (2013.01); *B01D 2257/108* (2013.01); *C02F 2101/006* (2013.01)

(58) Field of Classification Search
CPC ...... B01D 53/02–12; B01D 53/14–185; B01D 53/0423; B01D 53/0462; C01B 4/00; C02F 2101/006; C02F 1/28–288; C02F 1/281; C02F 1/285; G21F 9/12; G21F 9/16–18; G21F 9/301
USPC .................................................. 95/241–266
See application file for complete search history.

(56) References Cited

U.S. PATENT DOCUMENTS

| | | | |
|---|---|---|---|
| 4,190,515 A | 2/1980 | Butler et al. | |
| 4,259,209 A | 3/1981 | Nakane et al. | |
| 4,276,060 A | 6/1981 | Aldridge | |
| 4,411,755 A | 10/1983 | Herman et al. | |
| 4,533,539 A | 8/1985 | Iniotakis et al. | |
| 4,589,891 A | 5/1986 | Iniotakis et al. | |
| 4,755,471 A | 7/1988 | Saito et al. | |
| 4,875,945 A | 10/1989 | Penzhorn et al. | |
| 5,128,291 A * | 7/1992 | Wax | B01J 20/06 210/198.2 |
| 5,154,878 A | 10/1992 | Busigin et al. | |
| 5,319,955 A | 6/1994 | Chastagner | |
| 5,445,803 A | 8/1995 | Dworschak et al. | |
| 6,165,438 A | 12/2000 | Willms et al. | |
| 6,632,367 B1 | 10/2003 | Furlong et al. | |
| 7,470,350 B2 | 12/2008 | Bonnett et al. | |
| 7,815,890 B2 | 10/2010 | Busigin | |
| 8,470,073 B2 | 6/2013 | Hueng et al. | |
| 9,682,860 B2 | 6/2017 | Maroun et al. | |
| 2005/0263453 A1 | 12/2005 | Collias et al. | |
| 2007/0246344 A1 | 10/2007 | Bonnett et al. | |
| 2010/0021372 A1 | 1/2010 | Bonnett et al. | |
| 2011/0243834 A1 | 10/2011 | Denton | |
| 2012/0060688 A1* | 3/2012 | Heung | B01D 59/26 95/115 |
| 2013/0108517 A1 | 5/2013 | Tosti et al. | |
| 2013/0115156 A1 | 5/2013 | Ghirelli et al. | |
| 2014/0356270 A1 | 12/2014 | Shmayda et al. | |
| 2015/0053373 A1 | 2/2015 | Heung et al. | |
| 2016/0284433 A1 | 9/2016 | Xiao et al. | |
| 2016/0310898 A1 | 10/2016 | Denton et al. | |
| 2017/0036193 A1 | 2/2017 | Xiao et al. | |
| 2018/0056240 A1 | 3/2018 | Xiao et al. | |

FOREIGN PATENT DOCUMENTS

| | | | |
|---|---|---|---|
| EP | 0198940 | 10/1986 | |
| EP | 0198940 A1 * | 10/1986 | .............. C01B 4/00 |
| EP | 0698893 | 2/1996 | |
| GB | 2039866 | 8/1988 | |
| JP | 53093294 | 8/1978 | |
| JP | 53110800 | 9/1978 | |
| JP | 11137969 | 5/1999 | |
| JP | 2003-071251 | 3/2003 | |
| JP | 2007-155355 | 6/2007 | |
| WO | WO 90/10935 | 9/1990 | |
| WO | WO 2006/045886 | 5/2006 | |
| WO | WO 2006/112746 | 10/2006 | |
| WO | WO 2016/035737 | 3/2016 | |

OTHER PUBLICATIONS

Ducret, et al. "Hydrogen isotopes separation by thermal cycling absorption process" *Fusion Eng. Des.* 58-59 (2001) pp. 417-421.

Iwai, et al. "Influence of Framework Silica-to-Alumina Ratio on the Tritiated Water Adsorption and Desorption Characteristics of NaX and NaY Zeolites" *J. Nucl. Sci. Techn.* 45(6) (2008) pp. 532-540.

Lee, M.W. "Thermal Cycling Absorption Process—A New Way to Separate Hydrogen Isotopes" *Westinghouse Savannah River Co.* WSRC-MS-2000-00061 (2000) pp. 197-200.

Lin, K.H. "Tritium Enrichment by Isotope Separation Technique" *Oak Ridge Natl. Lab.* ORNL-TM-3976 (1972).

Qian, et al. "Comparation of Two Separation Materials Used in Thermal Cycling Absorption Process" *J. Nucl. Radiochem.* 34(3) (2012) pp. 174-178.

Reyes, et al. "Life Tritium Processing: A Sustainable Solution for Closing the Fusion Fuel Cycle" *Lawrence Livermore Natl. Lab.* LLNL-TR-576952 (2012) pp. 1-9.

Shimizu, et al. "Numerical study on extraction of tritium generated in HMR by way of system composed of EXEL-process and thermal diffusion column cascade" *Nukleonika* 47(Supp. 1) (2002) pp. S89-S93.

Wu, et al. "Experimental study on hydrogen isotope separation using twin-bed periodically counter-current flow technique" *Fusion Sci. Techn.* 61(1) (2012) pp. 81-85. (Abstract only).

ISA International Search Report & Written Opinion—PCT/US2013/069826 (dated Sep. 16, 2014).

EPO Extended European Search Report—13897566.9 (dated Jul. 19, 2017).

Official Action—JP 2016-530871 (dated Aug. 28, 2017).

Andreev, et al. "Ch. 1—Theory of Isotope Separation in Counter-Current Columns: Review" *Separation of Isotopes of Biogenic Elements in Two-phase Systems* (2007) pp. 1-40.

Demange, et al. "Zeolite membranes and palladium membrane reactor for tritium extraction from the breeder blankets of ITER and DEMO" *Fusion Eng. Design* 88 (2013) pp. 2396-2399.

Iwai, et al. "Experimental evaluation of tritium oxidation efficiency in the room temperature recombiner" *Fusion Eng. Design* 136 (2018) pp. 120-124.

Michling, et al. "Capture and Isotopic Exchange Method for Water and Hydrogen Isotopes on Zeolite Catalysts up to Technical Scale for Pre-Study of Processing Highly Tritiated Water" *Fusion Sci. Tech.* 67 (2015) pp. 483-486.

Park, et al. "Hydrophobic Polydimethylsiloxane (PDMS) Coating of Mesoporous Silica and Its Use as a Preconcentmting Agent of Gas Analytes" *Languir* 30 (2014) pp. 10256-10262.

Shmayda, et al. "The Laboratory for Laser Energetics' Hydrogen Isotope Separation System" *Fusion Eng. Design* 109-111 (2016) pp. 128-134.

Shu, et al. "Highly Tritiated Water Processing by Isotopic Exchange" *Fusion Sci. Tech.* 67 (2015) pp. 563-566.

\* cited by examiner

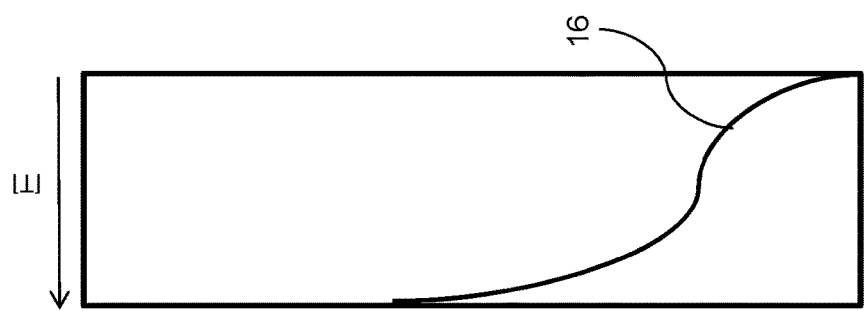
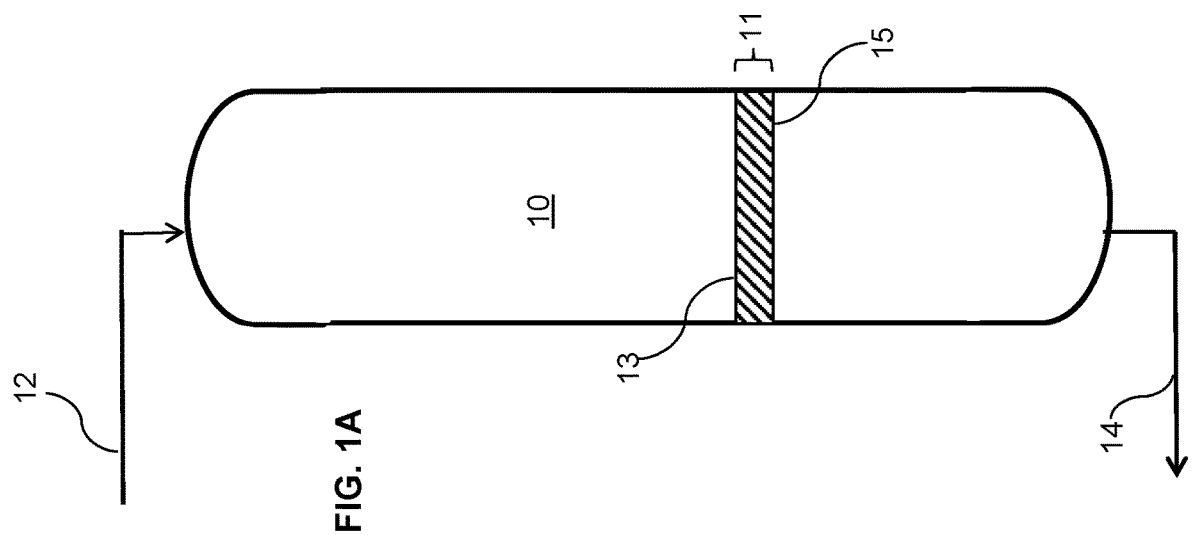

DECONTAMINATION OF TRITIATED WATER

CROSS REFERENCE TO RELATED APPLICATION

This application is a divisional application of U.S. patent application Ser. No. 15/034,611, which is the United States national stage entry of International Patent Application No. PCT/US2013/069826 filed under the Patent Cooperation Treaty, having a filing date of Nov. 13, 2013, and which is incorporated herein by reference for all purposes.

STATEMENT AS TO RIGHTS TO INVENTIONS MADE UNDER FEDERALLY SPONSORED RESEARCH

This invention was made with Government support under Contract No. DE-AC09-08SR22470 awarded by the United States Department of Energy. The Government has certain rights in the invention.

BACKGROUND

Tritium is a low energy beta emitter, and while it is not dangerous externally, it is a radiation hazard upon inhalation, ingestion or absorption. Tritium can be produced in nuclear power generation as a by-product of the fission of uranium-235, plutonium-239, and uranium-233, as well as by neutron activation of lithium-6. In heavy water, moderated and cooled reactors tritium can be produced when a deuterium nucleus captures a neutron. Though relatively small amounts of tritium are produced via such routes, it readily binds hydroxyl radicals to form tritiated water. As such, tritiated water can build up over time within cooling water, as well as within water used in storage pools at nuclear power generating facilities. For example, tritiated water is understood to be the major source for aqueous release of radioactivity to surface streams and rivers from nuclear power generation facilities, and the 2011 Japanese earthquake resulted in the release of millions of gallons of tritium-contaminated water from the Fukushima Daiichi nuclear plant. Tritium contamination of groundwater in the vicinity of nuclear power generation facilities has led to public outcry and negative publicity for the nuclear power industry.

Methods that have been developed for the removal of tritium from contaminated water include water distillation, cryogenic distillation, electrolysis, and gas/liquid catalytic exchange. Unfortunately, problems exist with such methods. For instance, water distillation is energy intensive, as the water ($H_2O$) vapor pressure is 1.056 times of that of tritiated water (HTO). Due to a high reflux ratio of about 30, huge reboiler duty and large column diameter are required. The small separation factor also requires an extreme column height for the hundreds of theoretical plates necessary for the process. Cryogenic distillation has shown promise, but the successful production experience of more recently developed technologies such as the thermal cycling adsorption process (TCAP) exhibit improved performance. Electrolysis has a very good tritium separation factor; however, it is difficult to stage and is very energy intensive. Catalytic exchange has been combined with electrolysis in a process known as Combined Electrolysis Catalytic Exchange (CECE), which is the only proven production-scale process to decontaminate tritiated water. Unfortunately, the process requires a high concentration of tritium in the treatment water, and the current capacity is still orders of magnitudes smaller than the need in many facilities.

Effective treatment of tritiated water is technically very challenging due to the large volume and low contaminant concentration of existing tritiated water. For instance, existing storage facilities are more than 90% full and contain hundreds of thousands of tons of contaminated water for treatment. There are simply no current methods or systems that can handle such volume.

What are needed in the art are methods and systems that can remove tritium from contaminated water sources. Moreover, methods and systems with a very high decontamination factor (the ratio of inlet and outlet tritium concentration) would be of great benefit.

SUMMARY

Aspects and advantages of the invention will be set forth in part in the following description, or may be obvious from the description, or may be learned through practice of the invention.

According to one embodiment, disclosed is a process for removal and recovery of tritium from tritium-contaminated water. The process includes contacting a separation phase with an aqueous stream. The aqueous stream includes tritium, and the separation phase has an isotopic separation factor of about 1.06 or greater. Upon contact between the aqueous stream and the separation phase, tritium is preferentially adsorbed onto the surface of the separation phase, for instance at water molecules and/or hydroxyl groups of the separation phase.

Following this initial stage, the process can include contacting the separation phase with a gaseous stream. The gaseous stream includes protium and/or deuterium in the form of hydrogen gas ($H_2$), deuterium gas ($D_2$), and/or hydrogen deuteride (HD). Upon contact between the gaseous stream and the separation phase, the tritium can be exchanged with hydrogen of the gaseous phase. The separation phase can also include a catalyst, e.g., platinum, to encourage this transfer. The product gas from this stage is a gaseous flow that is enriched in tritium.

Following this second stage, the gaseous flow that is enriched in tritium can be further treated to recover the tritium from the enriched tritium gaseous stream. For example, the tritium enriched gaseous flow can be subjected to a thermal cycling adsorption process in which the stream is cycled between a high and low temperature and in contact with a material that preferentially adsorbs tritium at the low temperature. Following this preferential adsorption, the temperature is cycled to the higher level, and tritium gas is released from the material and collected in a product stream.

Also disclosed is a system for carrying out the disclosed process. The system can include an enrichment column that can be utilized in counter-flow direction for both the first stage and the second stage of the process. For instance, the enrichment column can include a liquid inlet at a first end (e.g., at the top) for the aqueous stream that includes the tritiated water and can include a liquid outlet at a second end (e.g., at the bottom) for the clean aqueous stream that is removed from the column during the first stage. The column can also include a gaseous inlet at the second end for the gaseous stream that includes protium and/or deuterium and a gaseous outlet at the first end for the gaseous stream that is enriched in tritium. The system can also include a thermal cycling adsorption column that is in fluid communication with the enrichment column. The thermal cycling adsorption column can separate the tritium from the gaseous stream by use of a material that preferentially adsorbs tritium at an adsorption temperature. In one embodiment, the system can also include a second thermal cycling adsorption column that is in fluid communication with the enrichment column that can separate deuterium and tritium from protium of the gaseous stream by use of a material that preferentially adsorbs protium at an adsorption temperature.

BRIEF DESCRIPTION OF THE FIGURES

A full and enabling disclosure of the present invention, including the best mode thereof, directed to one of ordinary skill in the art, is set forth in the specification, which makes reference to the appended figure, in which:

FIG. 1 illustrates the elements of an enrichment column that can be utilized in the first stage of the separation process (FIG. 1A) and a concentration profile for tritium following the first stage of the process (FIG. 1B).

DETAILED DESCRIPTION

Figure 2:
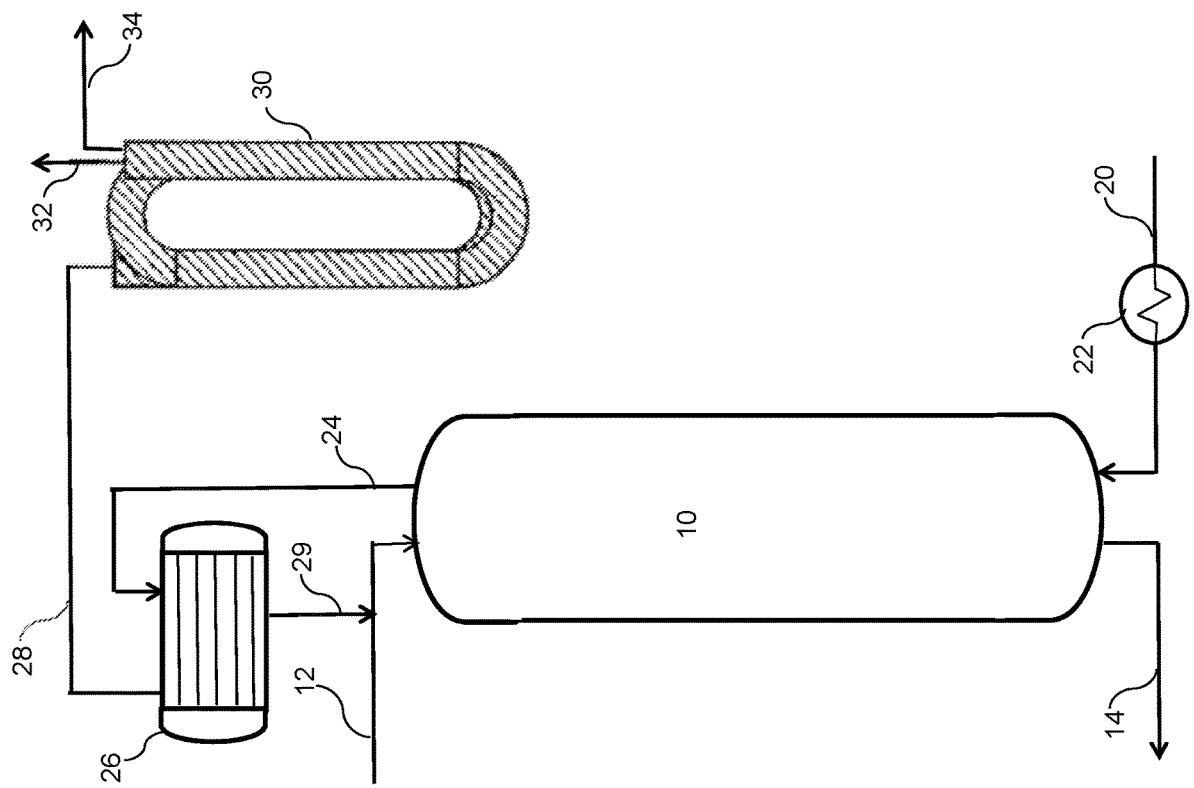
FIG. 2 illustrates a system as may be utilized in a separation process.

It is to be understood by one of ordinary skill in the art that the present discussion is a description of exemplary embodiments only and is not intended as limiting the broader aspects of the present disclosure. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, disclosed herein are methods and systems directed to the separation of tritium from an aqueous stream. More specifically, the separation method is a multi-stage method that includes a first stage during which tritium of a tritium-contaminated aqueous stream is adsorbed onto a separation phase, a second stage during which the adsorbed tritium is exchanged with hydrogen in a gaseous stream to provide a gaseous stream with a high tritium concentration, and a third stage during which the tritium of the gaseous stream is separated from the gaseous stream as a gaseous tritium product.

Difficulties with previously known tritium separation methods have often centered around the large volume and low tritium concentration contained in the contaminated water to be treated. Through volume reduction of the tritium contaminated aqueous feed in the first stage of the process, a gaseous stream with a high tritium concentration can be formed in the second stage, which can provide very high tritium recovery from the tritium separation stage. Moreover, through volume reduction of the contaminated water to be treated, the system can be a large capacity system; for instance, able to treat about 1,000 tons of contaminated water per day, or even more in larger capacity systems.

Beneficially, the enrichment column of a system for carrying out the process can be utilized in both the first and second stage of the process in a counter-flow design. In the first stage of the process, the contaminated water can flow into the top of the enrichment column and purified water can flow out of the bottom of the enrichment column, and in the second stage of the process the hydrogen gaseous flow can flow into the bottom of the column and the tritium-enriched gaseous flow can flow out of the top of the column. The utilization of a single enrichment column for two stages of the process can provide significant cost savings to the process.

The process and system can provide additional benefits as well. For instance, the process is very energy efficient as it does not require boiling or electrolyzing of the feed stream. The ability to scale the system to both high volume and low volume throughput provides a route to specifically design a system for any size facility. Moreover, the throughput of an existing system can be increased through the addition of one or more additional enrichment columns to an existing system, without the necessity of altering the existing enrichment column(s).

Referring to FIG. 1, one embodiment of the first stage of a system and process is illustrated. The system includes an enrichment column 10 that can be utilized for both the first and second stages of a process. In FIG. 1A is illustrated the system during a first stage during which a contaminated stream including tritiated water (HTO) can be purified to remove the tritium from the stream. The system includes a liquid inlet 12 for feeding a liquid stream of contaminated water into the enrichment column 10. While illustrated with the liquid inlet 12 at the top of the column, it should be understood that the liquid flow through the column can alternatively be in the opposite direction, i.e., from the bottom of the column to the top.

The enrichment column can be designed to process a high volume of contaminated water, for instance about 500 tons per day or greater, about 800 tons per day or greater, or about 1000 tons per day or greater, in one embodiment. Accordingly, the enrichment column can be designed to accommodate the desired capacity. For example, the enrichment column can have an inside diameter of about 5 feet or greater, or about 6 feet or greater, and can have a height of about 50 feet or greater, about 60 feet or greater, or about 70 feet or greater, in one embodiment. Of course, the dimensions of the enrichment column are not critical to the system and can be varied to accommodate any particular system, and the dimensional design of an enrichment column would be well within the abilities of one of skill in the art.

The system and method can effectively treat high volumes of contaminated water having low concentration of tritium contaminant. For instance, the contaminated water can include tritium at a concentration on the order of parts per billion or parts per trillion. By way of example, the system can treat a contaminated water stream including a tritium contaminant at a concentration of about 1 part per billion (ppb) or less, about 500 parts per trillion (ppt) or less, or about 100 ppt or less. In one embodiment, the contaminated water can include tritium in a concentration of about 20 ppt or less.

The aqueous stream to be treated can be pre-treated in one embodiment. For instance, in those embodiments in which the contaminated stream includes water from an open environmental source, such as sea water, the aqueous stream can be de-ionized prior to carrying out the decontamination process.

A separation phase can be carried out within the enrichment column. The separation phase can preferentially adsorb tritiated water as the liquid stream passes through the column and thus load the tritiated water on the separation phase. While the separation phase is not particularly limited, it can have an isotopic separation factor of about 1.06 or greater, for instance about 1.1 or greater, or about 1.2 or greater, in one embodiment. As utilized herein the term 'isotopic separation factor' α, is defined as follows:

$$\alpha = [C'/(1-C')]/[C''/(1-C'')],$$

where C' and (1−C') are the relative concentrations of $H_2O$ and HTO, respectively, in the enriched mixture at the outlet 15 of a finite separation stage 11 in the enrichment column 10, and C" and (1−C") are the corresponding quantities in the starting mixture at the inlet 13 of the finite separation stage 11

The column 10 can have multiple individual separation stages 11 or equivalent (e.g., tens, hundreds, or even thousands of individual finite separation stages). The separation phase can be a high surface area material. For instance, the separation phase can be either organic or inorganic and can be a solid or a gel. By way of example, the separation phase can include porous particles have an average diameter in the millimeter range (e.g., about 5 millimeters or less) and can have a large surface area, e.g., about 100 square meters per gram ($m^2/g$) or greater, about 200 $m^2/g$ or greater, or about 300 $m^2/g$ or greater. In those embodiments in which the separation phase includes porous materials, the average pore diameter can generally be on the order of about 500 Angstroms (Å) or less, for instance about 300 Å or less, or about 200 Å or less, in one embodiment.

Specific materials as may be utilized as the separation materials can include, without limitation, polymeric materials (e.g., polystyrene/divinylbenzene, polyacrylic/dinvylbenzene), aluminas, silicas, aluminum silicates (e.g., clays, zeolites), silica gels, and so forth. By way of example, zeolites (also commonly referred to as molecular sieves) as may be utilized can include low silica (aluminum rich) zeolites A and X (e.g., type 3A, type 4A, type 5A, type 13X) that have a surface that is highly selective for water.

The separation phase can include one or more functional groups and/or associated molecules that can encourage adsorption of tritium and/or tritiated water at the surface of the separation phase. For example, the separation phase can include hydroxyl groups at the surface of the material, which can encourage the isotopic exchange of tritium with the protium of the hydroxyl groups.

In one embodiment, the separation phase can be hydrated, and include water molecules that can be exchanged with tritiated water molecules during the first stage of the process. Such materials have been described, e.g., in Journal of Nuclear Science and Technology, 45(6), 532, 2008, and in U.S. Pat. No. 6,632,367 to Furlong, et al., which is incorporated herein by reference. According to this embodiment, the separation material can include metal ions or other ions that can have associated therewith water molecules of hydration. For instance, the separation material can include a cationic portion that can be associated with one or more water molecules. Cationic portions can include, without limitation, ammonium cations or metal cations, such as aluminum, magnesium, copper, zinc, cobalt, or chromium.

During the first stage of the process, tritium of the input stream can be adsorbed on to the surface of the separation phase and clean, decontaminated water can exit the bottom of the enrichment column at 14. For instance, the water stream that exits the bottom of the enrichment column can have a radioactivity level from tritiated water of about 60,000 Becquerel per milliliter (Bq/mL) or less, about 30,000 Bq/mL or less, about 10,000 Bq/mL or less, about 1000 Bq/mL or less, about 100 Bq/mL or less, or about 60 Bq/m L or less.

The adsorbed tritium of the enrichment column will describe a concentration profile as the tritium is trapped from the top of the column. A typical concentration profile 16 for tritium is illustrated in FIG. 1B, which illustrates the decreasing concentration of tritium from the top to the bottom of the enrichment column following the first stage of the process. The first stage of the process can continue until the column effluent reaches radioactive breakthrough, e.g., radioactivity due to tritium reaches about 60 Bq/m L. Following radioactive breakthrough in the effluent, the aqueous flow through the enrichment column can be stopped and the second stage of the process can be carried out.

FIG. 2 illustrates the system of FIG. 1 with the addition of the second stage to the enrichment column. During the second stage, a gaseous flow including hydrogen gas can be fed to the bottom of the enrichment column, as at 20. Alternatively, the gaseous flow can be fed to the top of the enrichment column and can exit out of the bottom of the column. The hydrogen gas can include protium, deuterium, or a mixture thereof in the form of $H_2$, $D_2$, and/or HD. Hydrogen of the gaseous flow 20 can exchange with tritium on the column to enrich the gaseous flow at the gaseous outlet in tritium.

To encourage the exchange of the second stage, the input gaseous flow 20 into the enrichment column 10 can be passed through a heater 22 that can heat the gaseous flow to a temperature of from about 50° C. to about 373° C. and a pressure to maintain water at liquid phase (0-218 atmosphere).

A catalyst can be included in the enrichment column 10 to encourage the exchange of protium for tritium. The catalyst can be a component of the separation phase utilized in the first stage or can be a separate material that is incorporated within the enrichment column in conjunction with the separation phase, as desired. For instance, a platinum catalyst can be loaded onto the separation phase utilized in the first stage and can serve to catalyze exchange of tritium adsorbed to the separation phase in the first stage with protium of the gaseous flow through the enrichment column 10 during the second stage. Other materials for use as a catalyst can include, without limitation, elements of Group VIII of the periodic table (Fe, Co, Ni, Ru, Rh, Pd, Os, Ir). The flow rate of the gaseous flow through the enrichment column can vary. For example, in one embodiment, at a flow rate of about 52 liters per minute, a gaseous flow through the enrichment column can pick up about 100 parts per million (ppm) tritium. Moreover, the exchange of protium for tritium on the enrichment column can recharge the column for a repeat of the first stage of the process with a new flow of contaminated water through the column. Thus, the system can provide a self-recharging exchange column, which can decrease down time of a system and provided additional cost savings and other added benefits.

The gaseous flow that is enriched in tritium can exit the enrichment column 10, as at 24, and can be further processed for recovery of tritium from the flow. For instance, the gaseous flow can be passed through a condenser 26 and any water recovered from the stream can be recycled 29 to the aqueous flow inlet 12 of the first stage of the process.

To improve throughput of the semi-continuous process, in one embodiment the system can include two (or more) enrichment columns that can operate in inverse stages to one another. For instance, a first enrichment column can be operating in the first stage of a process, and a second enrichment phase can be simultaneously operating in the second stage of a process. In such a fashion, a gaseous flow that is enriched in tritium can be continuously coming off of at least one of the enrichment columns, and the output from the system can be continuous. Additional enrichment columns can be included to further increase throughput and the rate of continuous removal of enriched tritium from a system.

In yet another embodiment, a single enrichment column can be operated in a continuous fashion, with continuous counter-flow of the contaminated water stream in one direction through the enrichment column and a simultaneous flow of hydrogen gas in a counter-direction to the aqueous flow.

The tritium-enriched gaseous flow 24 can include tritium in a relatively high concentration, for instance about 5 ppm or greater, about 10 ppm or greater, or about 100 ppm or greater. Following the first and second stages of the process, the enriched gaseous flow 28 can be further processed for recovery of tritium in a third stage of the process, for instance, according to a thermal cycling adsorption process (TCAP) as is known in the art. One embodiment of a TCAP that may be utilized has been described in U.S. Pat. No. 8,470,073 to Heunq, et al., which is incorporated herein by reference. The system of FIG. 2 illustrates one embodiment of a TCAP as may be incorporated in a system. In this embodiment, an inverse column 30 can be utilized that can separate the enriched gaseous flow 28 into a tritium stream 32 and a hydrogen stream 34.

According to one embodiment, an inverse column 30 can include an adsorbent that preferentially adsorbs the heavier hydrogen isotope. That is, the adsorbent of the column 30 adsorbs tritium better than deuterium, and deuterium better than protium. During use, the column 30 can be heated and cooled to cycle the temperature between a low temperature and a high temperature. The specific temperatures of the cycle can vary depending upon the specific adsorbent used. For instance, in one embodiment, the column can be cycled between about 90° C. and about 180° C. At the lower temperature, the inverse column can adsorb hydrogen (and preferentially the heavier isotope(s) of hydrogen), and at the higher temperature, the adsorbed hydrogen can be released. The amount of the heavy hydrogen isotope that is adsorbed by the column can vary depending upon flow rate and pressure of the gas.

Adsorbents for use in the inverse column can include, without limitation, a molecular sieve, activated carbon, alumina, silica, silica-alumina, clays, or mixtures of materials. Molecular sieves as may be utilized can include, for example, type 3A, type 4A, type 5A, type X, type Y, ZSM-5, Mordenite, type L, Omega, or other types having 3-10 Angstrom pore diameters that preferentially adsorb the heavier hydrogen isotopes. Transition metals, such as vanadium and chromium and their alloys, that can preferentially absorb hydrogen isotopes and have isotopic effect similar to the molecular sieves can also be used.

During use, the inverse column is alternatively heated and cooled. During the cool cycle, the tritium of the enriched gaseous flow is preferentially adsorbed by the inverse column, and the output line 34 can contain primarily the lighter isotope (protium). During the hot cycle, the adsorbed material is release, and the output line 32 can contain primarily the heavier isotope (tritium).

As previously stated, the gaseous flow input 20 to the second stage can optionally include deuterium in conjunction with hydrogen. In this embodiment, it may be desired to separate all three isotopes from one another to obtain three product lines—one including primarily protium, one including primarily deuterium, and one including primarily tritium. In this embodiment, illustrated in FIG. 3, the third stage of the process can include multiple separation columns 130, 131, 133, that can together separate the three isotopes from one another.

According to one embodiment, the first and second separation columns 131, 133 can incorporate an adsorbent that preferentially adsorbs the lighter hydrogen isotopes, and thus, has the opposite isotopic effect of an inverse separation column as described above. For instance, first and second separation columns can incorporate a palladium adsorbent that adsorbs the hydrogen isotopes in order by preference of protium>deuterium>tritium. In addition, the adsorbent of the first and second separation columns 131, 133 can adsorb hydrogen isotopes at a low temperature and release the adsorbed hydrogen isotopes at an increased temperature.

The adsorbent, e.g., palladium, can be supported on an inert support material, such as diatomaceous earth (also known as kieselguhr), which does not directly adsorb or separate hydrogen isotopes but can function as support for the adsorbent (e.g., palladium) to increase reaction kinetics and reduce pressure drop as the gas flows through the columns 131, 133.

When utilizing a palladium adsorbent, the separation columns can be cycled from a low temperature of about 90° C. to a high temperature of about 180° C. At the lower temperature, hydrogen is adsorbed onto the adsorbent, with preference for protium adsorption, and at the higher temperature, the adsorbed materials are released from the adsorbent.

Figure 3:
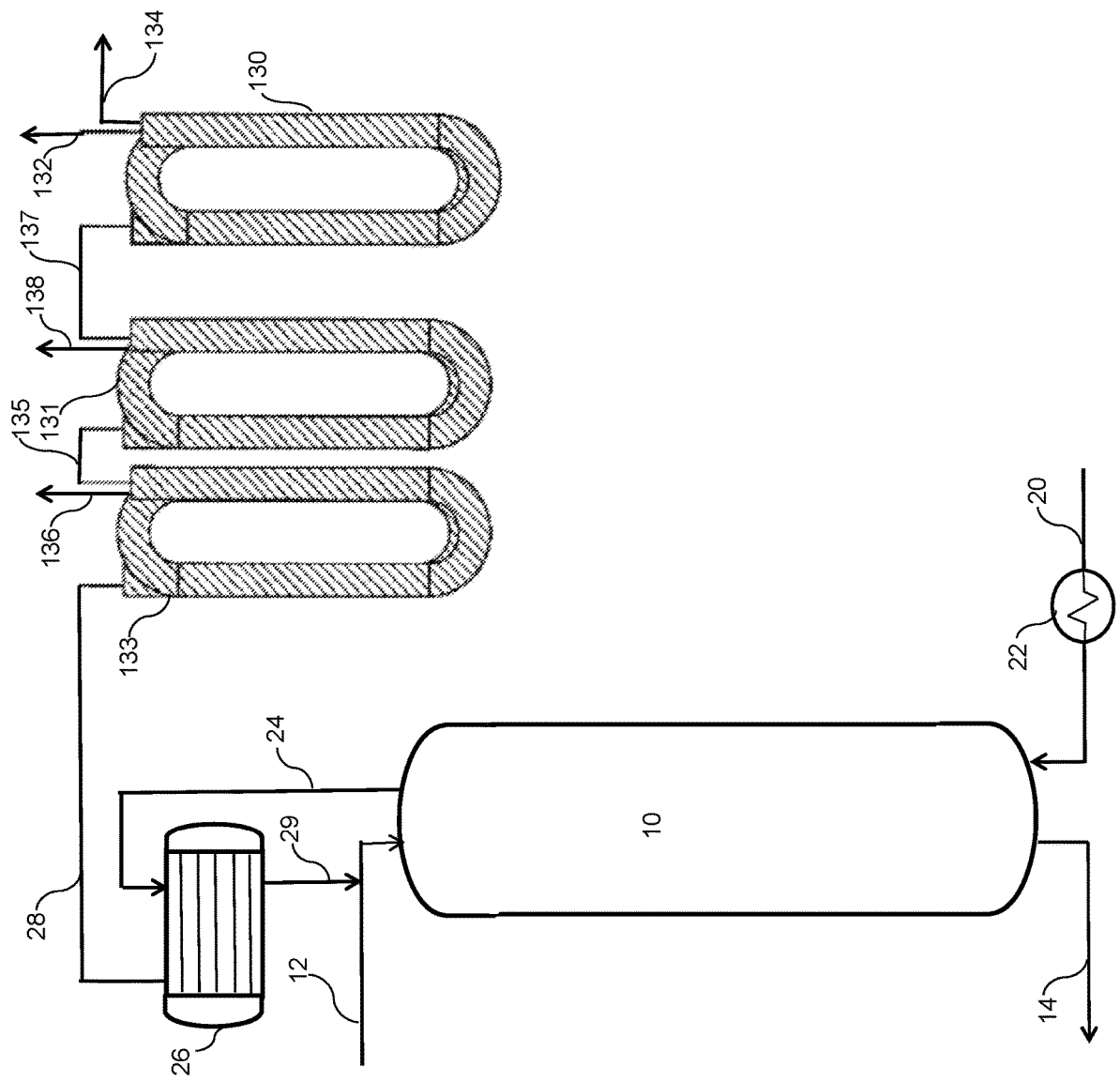
FIG. 3 illustrates another embodiment of a system as may be utilized in a separation process.

During a process, and with reference to FIG. 3, the enriched gaseous flow 24 from the enrichment column 10 can pass through a condenser 26, with liquid 29 being removed from the flow and returned to the enrichment column 10 with the contaminated water flow 12 to be processed by the system. The enriched gas flow 28 that exits the condenser 26 can flow to the first separation column 133, which can contain an adsorbent that preferentially adsorbs the lighter hydrogen isotopes. During the cold portion of the cycle, protium can be preferentially adsorbed with the column 133 and the exit stream 135 from the column 133 can include deuterium and tritium of the gas flow 28, as well as any protium that was not adsorbed within the column 133. During the hot portion of the cycle, the adsorbed protium can be released from the adsorbent and a product stream 136 that includes primarily protium can be obtained.

The stream 135 that exits the first separation column 133 can enter the second separation column 131, and the process of the first separation column 133 can be repeated to separate any remaining protium from the feed stream 135. Thus, the exit stream 137 from the separation column 131 that exits the column during the cold phase of the cycle will include deuterium and tritium, and the exit stream 138 that exits the separation column 131 that exits the column during the hot phase of the cycle will include protium.

The third separation column 130 can be an inverse column as described above and can include an adsorbent that preferentially adsorbs the heavier isotope, tritium, during the cold phase of the cycle. Thus, the exit stream 134 that exits the inverse column 130 during the cold phase of the cycle can include primarily deuterium, and the exit stream 132 that exits the inverse column during the hot phase of the cycle can include primarily tritium.

A system as described herein can separate and recover about 95% or greater, about 97% or greater or about 99% or greater of the tritium contained in a contaminated aqueous stream that is treated by the multi-stage process. In addition, the system can recover a relatively pure tritium. For instance, when considering a system that can process about 1000 tons per day of contaminated water that includes tritium contaminant in an amount of about 17 ppt, a tritium product can be obtained in an amount of from about 60 to about 65 mL of tritium per day, representing a 99% recovery of the tritium contained in the contaminated stream. The purified water obtained in the first stage of the process can include less than about 60 Bq/mL radioactivity from tritium, and the light hydrogen isotope product(s) (i.e., protium and optionally deuterium) can include less than about 1 ppm tritium.

Tritium that is separated and recovered according to the disclosed process and system can be suitable for any use, as is known in the art. For instance, the recovered tritium can be utilized in self-powered lighting applications as a replacement for radium; as a fuel for controlled nuclear fusion reactions; or as a chemical tracer, for instance, as a radiolabel or as a tracer in ocean circulation and ventilation.

This written description uses examples to disclose the invention, including the best mode, and also to enable any person skilled in the art to practice the invention, including making and using any devices or systems, and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for removal and recovery of tritium from a tritium-contaminated aqueous stream, the system comprising:
    an enrichment column containing a solid separation phase, the solid separation phase comprising hydroxyl groups and having an isotopic separation factor of about 1.06 or greater, the enrichment column including a liquid inlet at a first end of the enrichment column for receiving the tritium-contaminated aqueous stream and a liquid outlet at a second end of the enrichment column for exit of a clean aqueous stream, the enrichment column further comprising a gaseous inlet at the second end of the enrichment column for receiving a gaseous flow that includes protium and/or deuterium in the form of a material selected from the group consisting of hydrogen gas, deuterium gas, hydrogen deuteride gas, and mixtures thereof, and a gaseous outlet at the first end of the enrichment column for exit of a tritium-enriched gaseous flow; and
    a thermal cycling adsorption column in fluid communication with the enrichment column, wherein the thermal cycling adsorption column is an inverse separation column and includes a tritium separation material that preferentially adsorbs tritium over protium and deuterium at an adsorption temperature and that releases the adsorbed tritium at a release temperature.

2. The system of claim 1, further comprising one or more additional thermal cycling adsorption columns in fluid communication with the first thermal cycling adsorption column, wherein the additional thermal cycling adsorption column(s) include a protium separation material that preferentially adsorbs protium over deuterium and tritium at an adsorption temperature.

3. The system of claim 2, wherein the protium separation material comprises palladium.

4. The system of claim 1, wherein the enrichment column has an inside diameter of about 5 feet or greater and a height of about 50 feet or greater.

5. The system of claim 1, further comprising a second enrichment column in fluid communication with the thermal cycling adsorption column.

6. The system of claim 1, the solid separation phase further comprising a catalyst.

7. The system of claim 6, wherein the catalyst comprises a material selected from the group consisting of platinum, iron, cobalt, nickel, ruthenium, rhodamine, palladium, osmium, and iridium.

8. The system of claim 6, the catalyst encouraging the transfer of tritium from the solid separation phase to a gas.

9. The system of claim 1, wherein the solid separation phase comprises a plurality of particles.

10. The system of claim 1, wherein the solid separation phase comprises a porous solid.

11. The system of claim 10, the porous solid having an average pore diameter of 500 Angstroms or less.

12. The system of claim 1, the solid separation phase having a surface area of 100 square meters per gram or greater.

13. The system of claim 1, the solid separation phase comprising a material selected from the group consisting of a polymer, an alumina, a silica, an aluminum silicate, and a zeolite.

14. The system of claim 1, the solid separation phase having an isotopic separation factor of about 1.1 or greater.

15. The system of claim 1, the solid separation phase having an isotopic separation factor of about 1.2 or greater.

16. The system of claim 1, wherein the solid separation phase comprises a gel.

17. The system of claim 1, further comprising a heater upstream of the gaseous inlet of the enrichment column.

18. The system of claim 1, wherein the liquid inlet is in fluid communication with an environmental source of the tritium-contaminated aqueous stream.

19. The system of claim 1, wherein the solid separation phase is a hydrated solid separation phase comprising ions associated with water molecules of hydration, the water molecules of hydration being available for exchange with tritiated water molecules during use of the system.

20. The system of claim 1, wherein the tritium separation material comprises a molecular sieve, a transition metal, activated carbon, alumina, silica, silica-alumina, clay, or a mixture thereof.

21. The system of claim 1, wherein the solid separation phase has an isotopic separation factor of about 1.06 or greater for tritiated water.

* * * * *